Aug. 10, 1965    R. G. HARTENSTEIN ET AL    3,199,340
ACCELEROMETER WITH FM OUTPUT
Filed May 29, 1963

INVENTORS
EDWARD J. KIRCHMAN
RAYMOND G. HARTENSTEIN

BY

ATTORNEYS

United States Patent Office 3,199,340
Patented Aug. 10, 1965

3,199,340
ACCELEROMETER WITH FM OUTPUT
Raymond G. Hartenstein, Seabrook, and Edward J. Kirchman, Baltimore, Md., assignors to the United States of America as represented by the Administrator of the National Aeronautics and Space Administration
Filed May 29, 1963, Ser. No. 284,265
5 Claims. (Cl. 73—88.5)
(Granted under Title 35, U.S. Code (1952), sec. 266)

The invention described herein may be manufactured and used by or for the Government of the United States of America for governmental purposes without the payment of any royalties thereon or therefor.

The invention relates to an improved transducer and in particular to an accelerometer with a frequency modulated output.

Many accelerometers can be found in the prior art. Most of these prior art accelerometers produce voltages whose amplitudes are proportional to the accelerations to which they are subjected. If these produced voltages are to be transmitted any appreciable distance they must be used to modulate a carrier frequency and then transmitted. In accordance with the present invention there is provided an accelerometer which directly produces a frequency modulated output which can be transmitted. The device is simple, rugged, small in size and has negligible weight making it ideal for use on space vehicles. It could be attached to a space vehicle at a remote location and transmit its frequency modulated output to a more suitable location on the vehicle for recording or retransmitting to ground stations. The signal produced by the device is of sufficient amplitude to drive the FM modulator of a standard transmitter as now used on flight programs.

It is therefore an object of the invention to provide an accelerometer with a frequency modulated output.

Another object of the invention is to provide an accelerometer which is simple, small in physical size, rugged and has negligible weight making it ideal for use on space vehicles.

A further object of the invention is to provide a transducer that will produce a frequency modulated electrical signal which is indicative of the mechanical strain to which the transducer is subjected.

Figure 1:
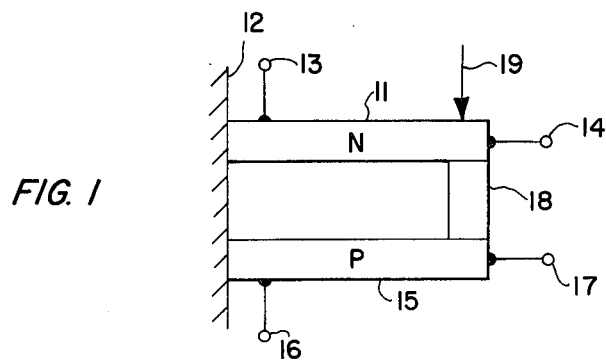
Figure 2:
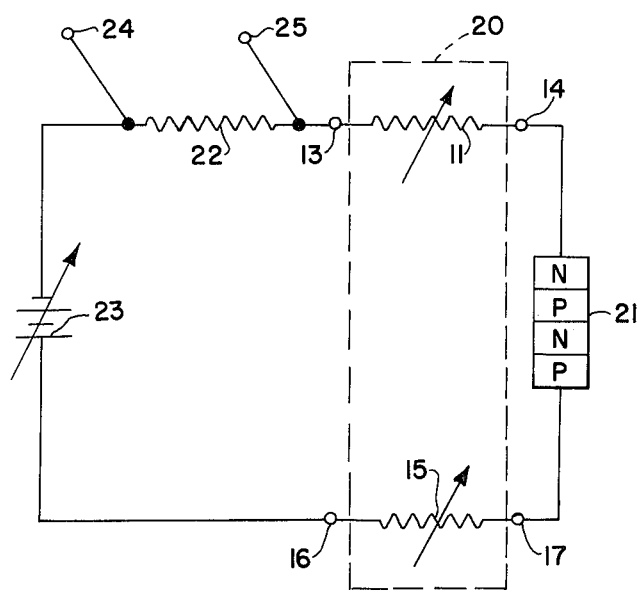

Other objects and a fuller understanding of the invention may be had by referring to the following specification and the accompanying drawings in which:

FIG. 1 shows a strain sensing device which is used in the preferred embodiment of the invention; and FIG. 2 shows a circuit diagram of the preferred embodiment of the invention.

In describing the preferred embodiment of the invention illustrated in the drawings, specific terminology will be resorted to for sake of clarity. However, it is not intended to be limited to the specific terms so selected, and it is to be understood that each specific term includes all technical equivalents which operate in a similar manner to accomplish a similar purpose.

In the preferred embodiment of the invention a resistor, a variable voltage source, a PNPN transistor having a negative resistance characteristic and two strain sensitive devices are connected in a series circuit. The transistor can be the PNPN hook collector type designed to have $\alpha > 1$ as described in "PNPN Transistor Switches" by J. L. Moll et al., Proceedings of the IRE, vol. 44, September 1956, or it can be any PNPN transistor having a negative resistance characteristic. The strain sensitive devices are any devices which will produce changes in resistance when they are subjected to a strain. In the preferred embodiment two semiconductor strain sensitive devices are used, however, one or more of any type strain sensitive device could be used. The voltage source is connected in the series circuit so as to back bias the intermost NP junction of the transistor. The voltage source is varied until oscillations are caused in the series circuit because of the negative resistance characteristic of the transducer. These oscillations produce a constant frequency signal across the resistor. Whenever the strain sensitive devices are subjected to a strain, the resistance connected in series with the transistor changes which changes the frequency of the signal produced across the resistor. This frequency change is related to the strain to which the strain sensitive devices are subjected and is the output of the preferred embodiment of the invention.

Turning now to the specific embodiment of the invention selected for illustration in the drawings, the number 11 in FIG. 1 designates a beam which is attached to a surface 12 to form a cantilever beam. Surface 12 can be any surface where a mechanical strain such as a strain due to acceleration, is to be measured. Beam 11 is made from strain sensitive semiconductor material such as N-type germanium which undergoes changes in resistance when it is subjected to a strain. When beam 11 is under tension it decreases in resistance and when it is under compression it increases in resistance. A terminal 13 is connected to one end of beam 11 and a terminal 14 is connected to the other end of beam 11. A beam 15 is also attached to surface 12 to form a cantilever beam. Beam 15 is made from strain sensitive semiconductor material such as P-type germanium which undergoes changes in resistance when it is subjected to a strain. When beam 15 is under tension it increases in resistance and when it is under compression it decreases in resistance. A terminal 16 is connected to one end of beam 15 and a terminal 17 is connected to the other end of beam 15. A spacer 18 is placed between beams 11 and 15 to transmit any strain on one of the beams to the other. Spacer 18 can be made from any suitable insulating material which will electrically insulate beams 11 and 15 from each other. When beam 11 and 15 are subjected to a strain indicated by arrow 19 the resistances of each of the beams will change. The magnitude of these changes is indicative of the magnitude of the strain to which these two beams are subjected.

Referring to FIG. 2 there is shown the strain sensitive devices disclosed in FIG. 1 connected in an electrical circuit. The electrical circuitry enclosed by the dotted box 20 in FIG. 2 is the strain sensitive beams 11 and 15 disclosed in FIG. 1. In FIG. 2 beam 11 is represented as a variable resistor 11 and beam 15 is represented as a variable resistor 15. One end of variable resistor 11 is connected to a first terminal of a PNPN transistor 21 and the other end of variable resistor 11 is connected to a first end of a resistor 22. One end of variable resistor 15 is connected to a second terminal of PNPN transistor 21 and the other end of variable resistor 15 is connected to the positive terminal of a variable voltage source 23. The negative terminal of voltage source 23 is connected to the other end of resistor 22. Terminals 24 and 25 are connected across resistor 22 to provide an output. Variable voltage source 23 is connected so as to back bias the intermost PN junction of transistor 21. Transistor 21 is designed to have a negative resistance characteristic such as the PNPN hook collector type transistor as described in the J. L. Moll et al. reference referred to above.

In the operation of this invention, variable voltage source 23 is varied, without any strain on beams 11 and 15, until oscillations are setup in the circuit of FIG. 2. These oscillations will produce a signal at some frequency across output terminals 24 and 25. Whenever beams 11 and 15 are subjected to a strain the resistances of these beams will vary which will change the frequency of the signal produced across terminals 24 and 25. This change in frequency across output terminals 24 and 25 is indicative of the strain to which beams 11 and 15 are subjected. Therefore the signal across terminals 24 and 25 is frequency modulated in accordance with the strain to which beams 11 and 15 are subjected.

It will be apparent to those skilled in the art that the novel principles of the invention disclosed herein with the specific exemplification thereof will suggest various modifications and applications of the same. For example, the invention is disclosed as an accelerometer, however, it could be used to measure any mechanical vibration or mechanical strain. With minor modifications the invention could be used to measure any phenomena which can be translated into mechanical displacement such as pressure or temperature. The preferred embodiment of the invention is disclosed as having two strain sensing means. However, any number could be used. Also, these strain sensing means could be any type strain gage which will change in resistance when strain is applied to it. It is also possible to make the outermost N and P layers of transistor 21 in the form of beams and let them function as the strain sensing means. It is accordingly desired that in construing the breadth of the appended claims they shall not be limited to the specific exemplification of the invention described herein.

What is claimed as new and desired to be secured by Letters Patent of the United States is:

1. A transducer for producing an electrical output which is frequency modulated in accordance with the magnitude of the strain to which the transducer is subjected comprising: a PNPN transistor having a negative resistance characteristic; strain sensing means for producing a resistance change related to the magnitude of said strain to which the transducer is subjected; an impedance; and a voltage source connected in series with said transistor, said strain sensing means, and said impedance in such a way as to back bias the innermost PN junction of said transistor whereby oscillations having a frequency related to the magnitude of said strain to which the transducer is subjected are produced across said impedance.

2. A transducer as claimed in claim 1 wherein said impedance is a resistor.

3. A transducer as claimed in claim 1 wherein said transducer is an accelerometer.

4. A transducer for producing an electrical output which is frequency modulated in accordance with the magnitude of a strain comprising: a resistor, a voltage source, and a PNPN transistor with a negative resistance characteristic connected in series in such a manner that the innermost PN junction of said transistor is back biased whereby constant frequency oscillaions are produced across said resistor; and strain sensitive means which produces a resistance change related to the magnitude of the strain to which it is subjected connected in series with said resistor, voltage source and transistor whereby when said strain sensitive means is subjected to said strain the frequency of said oscillations produced across said resistor will change.

5. A transducer for producing an electrical output which is frequency modulated in accordance with the magnitude of a strain comprising: an impedance, a voltage source and a transistor with a negative impedance characteristic connected in series whereby constant frequency oscillations are produced across said impedance; and strain sensitive means which produces an impedance change related to the magnitude of the strain to which it is subjected connected in series with said impedance, voltage source and transistor whereby when said strain sensitive means is subjected to said strain the frequency of said oscillations produced across said impedance will change.

References Cited by the Examiner
UNITED STATES PATENTS

| | | | |
|---|---|---|---|
| 2,697,594 | 12/54 | Stanton | 73—517 |
| 2,891,160 | 6/59 | Leblond | 331—132 |
| 3,015,784 | 1/62 | Circone | 331—107 |
| 3,015,959 | 1/62 | Pratt | 73—88.5 |
| 3,054,070 | 9/62 | Rutz | 331—107 |
| 3,075,088 | 1/63 | Li | 331—107 |

RICHARD C. QUEISSER, Primary Examiner.

JAMES J. GILL, Examiner.